(12) United States Patent
Tanie et al.

(10) Patent No.: US 11,539,254 B2
(45) Date of Patent: Dec. 27, 2022

(54) ELECTRIC DRIVE APPARATUS

(71) Applicant: DENSO CORPORATION, Kariya (JP)

(72) Inventors: Ryo Tanie, Kariya (JP); Hiroshi Endo, Kariya (JP)

(73) Assignee: DENSO CORPORATION, Kariya (JP)

( * ) Notice: Subject to any disclaimer, the term of this patent is extended or adjusted under 35 U.S.C. 154(b) by 177 days.

(21) Appl. No.: 16/807,441

(22) Filed: Mar. 3, 2020

(65) Prior Publication Data
US 2020/0295612 A1 Sep. 17, 2020

(30) Foreign Application Priority Data

Mar. 11, 2019 (JP) .............................. JP2019-044303

(51) Int. Cl.
| | |
|---|---|
| *H02K 3/12* | (2006.01) |
| *H02K 15/02* | (2006.01) |
| *H02K 7/116* | (2006.01) |
| *H02K 15/04* | (2006.01) |
| *H02K 3/28* | (2006.01) |
| *H02K 1/14* | (2006.01) |
| *H02K 1/18* | (2006.01) |

(52) U.S. Cl.
CPC .................. *H02K 3/12* (2013.01); *H02K 1/14* (2013.01); *H02K 1/187* (2013.01); *H02K 3/28* (2013.01); *H02K 7/116* (2013.01); *H02K 15/02* (2013.01); *H02K 15/0414* (2013.01)

(58) Field of Classification Search
CPC ... H02K 3/12; H02K 3/28; H02K 9/11; H02K 7/16; H02K 15/02
USPC ......... 310/54, 68 B, 680, 75 R, 98, 201–203
See application file for complete search history.

(56) References Cited

U.S. PATENT DOCUMENTS

| | | | | |
|---|---|---|---|---|
| 7,884,511 B2 * | 2/2011 | Mogi | ..................... | B60K 17/12 310/63 |
| 2010/0111731 A1 * | 5/2010 | Suzuki | ..................... | F04D 13/06 417/423.7 |

(Continued)

FOREIGN PATENT DOCUMENTS

| | | | |
|---|---|---|---|
| CN | 102801226 A | * 11/2012 | |
| JP | 2001231205 A | * 8/2001 | ............... H02K 3/50 |
| JP | 2009-303367 A | 12/2009 | |

(Continued)

OTHER PUBLICATIONS

Machine Translation JP2013174388 (Year: 2013).*

*Primary Examiner* — Jose A Gonzalez Quinones
(74) *Attorney, Agent, or Firm* — Oliff PLC

(57) ABSTRACT

An electric drive apparatus includes a rotating electric machine and a transmission. The transmission is provided, on one axial side of the rotating electric machine, integrally with the rotating electric machine. The rotating electric machine includes a stator coil that is assembled to a stator core to have first and second coil end parts respectively protruding from first and second axial end faces of the stator core. The axial protruding height of the second coil end part from the second axial end face of the stator core is larger than the axial protruding height of the first coil end part from the first axial end face of the stator core. The first coil end part is located on the same axial side of the stator core as the transmission whereas the second coil end part is located on the opposite axial side of the stator core to the transmission.

15 Claims, 8 Drawing Sheets

(56) References Cited

U.S. PATENT DOCUMENTS

| | | |
|---|---|---|
| 2017/0104281 A1 | 4/2017 | Kurono et al. |
| 2019/0245400 A1 | 8/2019 | Shinkai |

FOREIGN PATENT DOCUMENTS

| | | | |
|---|---|---|---|
| JP | 2012-170299 A | | 9/2012 |
| JP | 2013-174300 A | | 9/2013 |
| JP | 2013174388 A | * | 9/2013 |
| JP | 2016-063630 A | | 4/2016 |

* cited by examiner

ELECTRIC DRIVE APPARATUS

CROSS-REFERENCE TO RELATED APPLICATION

This application is based on and claims priority from Japanese Patent Application No. 2019-44303 filed on Mar. 11, 2019, the contents of which are hereby incorporated by reference in their entirety into this application.

BACKGROUND

1. Technical Field

The present disclosure relates to electric drive apparatuses which include a rotating electric machine and a transmission.

2. Description of Related Art

There is known an electric drive apparatus for a vehicle. The electric drive apparatus has both a rotating electric machine and a transmission integrated thereinto. For such an electric drive apparatus, it is desired to improve the output performance and to minimize the size for improving the mountability thereof to the vehicle.

SUMMARY

According to the present disclosure, there is provided an electric drive apparatus which includes a rotating electric machine and a transmission. The rotating electric machine includes a rotor, a stator and a housing. The rotor is provided on a rotating shaft so as to rotate together with the rotating shaft. The stator includes an annular stator core and a multi-phase stator coil. The housing has both the rotor and the stator received therein. The transmission includes a motive power transmitting unit that is configured to rotate with rotation of the rotating shaft. Moreover, in the electric drive apparatus, the transmission is provided, on one side of the rotating electric machine in an axial direction of the rotating shaft, integrally with the rotating electric machine. It should be noted that the expression "the transmission is provided integrally with the rotating electric machine" used hereinafter denotes that at least one component (e.g. a housing) of the transmission and at least one component (e.g., a housing) of the rotating electric machine are either (1) first formed separately from each other and then joined together into one piece or (2) integrally molded as a single component. The stator coil is assembled to the stator core to have first and second coil end parts respectively protruding from first and second axial end faces of the stator core. The axial protruding height of the second coil end part from the second axial end face of the stator core is larger than the axial protruding height of the first coil end part from the first axial end face of the stator core. The first coil end part is located on the same axial side of the stator core as the transmission whereas the second coil end part is located on the opposite axial side of the stator core to the transmission.

DESCRIPTION OF EMBODIMENTS

Figure 1:
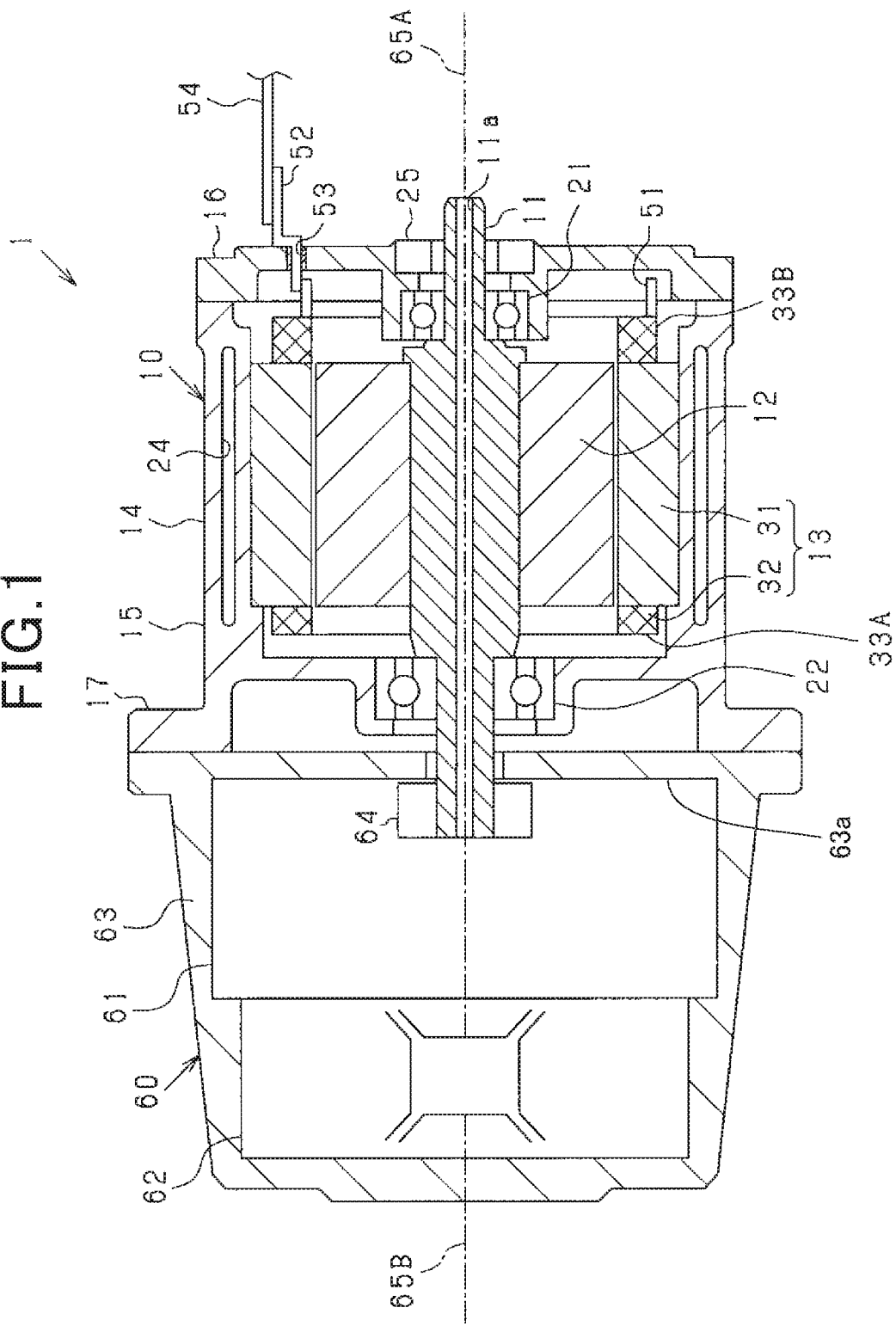
FIG. 1 is a longitudinal cross-sectional view of an electric drive apparatus according to an exemplary embodiment, the electric drive apparatus having both a rotating electric machine and a transmission integrated thereinto.

In the known electric drive apparatus (see, for example, Japanese Patent Application Publication No. JP 2013-174300 A), with the transmission arranged on one axial side of the rotating electric machine, the temperature of the rotating electric machine may be excessively increased at a transmission-side end part thereof. This problem becomes remarkable particularly when the output density of the rotating electric machine is increased, for example by increasing electric current supplied to a stator coil of the rotating electric machine, to improve the output performance of the electric drive apparatus and thus the amount of heat generated in the rotating electric machine is considerably increased.

However, no effective measure is taken in the known electric drive apparatus to dissipate heat generated in the rotating electric machine. Consequently, the output performance of the known electric drive apparatus may be lowered with increase in the temperature of the rotating electric machine.

To suppress increase in the temperature of the rotating electric machine, one may consider limiting the output density of the rotating electric machine. However, in this case, the output performance of the electric drive apparatus would be lowered.

As an alternative, one may consider adding a cooling portion or a heat dissipation structure to the rotating electric machine and/or the transmission. However, in this case, the size and/or the parts count of the electric drive apparatus would be increased.

In contrast, in the above-described electric drive apparatus according to the present disclosure, since the axial protruding height of the second coil end part is larger than the axial protruding height of the first coil end part, the surface area of the second coil end part is accordingly larger than the surface area of the first coil end part. Thus, more heat can be released from the second coil end part than from the first coil end part. Moreover, the amount of heat generated in the second coil end part is larger than the amount of heat generated in the first coil end part. On the other hand, it is easier for heat to be dissipated from the rotating electric machine to the outside on the opposite axial side of the stator core to the transmission than on the same axial side of the stator core as the transmission. Therefore, locating the second coil end part on the opposite axial side of the stator core to the transmission, it becomes possible to more effectively dissipate heat generated in the rotating electric machine than in the case of locating the first coil end part on the opposite axial side of the stator core to the transmission.

Moreover, with the above configuration, the axial length of the rotating electric machine remains unchanged in comparison with the case of locating the first coil end part on the opposite axial side of the stator core to the transmission. Consequently, it becomes possible to suppress increase in the size of the rotating electric machine and thus increase in the size of the entire electric drive apparatus.

Accordingly, with the above configuration, it becomes possible to suitably dissipate heat generated in the rotating electric machine while suppressing increase in the size of the electric drive apparatus.

In further implementations, the stator coil may be comprised of a plurality of phase windings. Each of the phase windings may have a plurality of turn portions formed by bending and a plurality of joints at each of which sections of the phase winding are joined together by welding. The turn portions may be included in the first coil end part of the stator coil and the joints may be included in the second coil end part of the stator coil.

With the above configuration, in the second coil end part, it is necessary to superpose and join each corresponding pair of distal end portions of the sections of the phase windings. Consequently, the axial protruding height of the second coil end part becomes larger than the axial protruding height of the first coil end part. In particular, in the case of joining each corresponding pair of the distal end portions of the sections of the phase windings by welding, to suppress the influence of heat applied during the welding process, it is necessary to secure a sufficiently long distance from the stator core to the distal end portions; it is also necessary to secure a sufficient weld zone at the distal end portions. Consequently, the axial protruding height of the second coil end part becomes considerably larger than the axial protruding height of the first coil end part. As a result, it becomes possible to further facilitate dissipation of heat generated in the rotating electric machine.

Moreover, for each of the phase windings of the stator coil, the sections of the phase winding may be respectively formed of electrical conductor segments. Each of the electrical conductor segments may be substantially U-shaped to have a pair of straight portions extending parallel to each other and one of the turn portions of the phase winding which extends, on the same axial side of the stator core as the transmission, to connect the pair of straight portions. Each corresponding pair of distal end portions of the electrical conductor segments may be joined together at one of the joints on the opposite axial side of the stator core to the transmission.

With the above configuration, it is possible to easily and reliably realize the axial protruding height of the second coil end part from the second axial end face of the stator core being larger than the axial protruding height of the first coil end part from the first axial end face of the stator core. Consequently, it becomes possible to easily and reliably realize the facilitation of dissipation of heat generated in the rotating electric machine.

In addition, forming each of the phase coils of the stator coil with the electrical conductor segments, the space factor of the stator coil in the stator may be improved and thus the amount of heat generated in the rotating electric machine may be increased with improvement in the output density thereof. However, even in this case, it is still possible to suitably dissipate heat generated in the rotating electric machine by facilitating the dissipation of heat at the second coil end part.

In the electric drive apparatus, there may be provided, on the same axial side of the stator core as the second coil end part, a neutral joint at which end portions of the phase windings of the stator coil are joined together to define a neutral point of the stator coil.

Since the neutral joint is located distantly from the stator core, it may be difficult for heat to be dissipated from the neutral joint and thus it may be easy for temperature to increase at the neutral joint. However, locating the neutral joint on the same axial side of the stator core as the second coil end part, i.e., on the opposite axial side of the stator core to the transmission, it is possible to facilitate dissipation of heat from the neutral joint.

In the electric drive apparatus, there may be provided, on the same axial side of the stator core as the second coil end part, busbars through each of which electric power is inputted to and outputted from one of the phase windings of the stator coil. The housing of the rotating electric machine may have a covering part arranged to cover the second coil end part. In the covering part of the housing, there may be formed a through-hole through which each of the busbars or a terminal member connected with the busbars extends from the inside to the outside of the housing.

With the above configuration, it is easy for heat to be released from the busbars. Consequently, heat can be dissipated from the second coil end part to the outside of the housing via the busbars. As a result, it becomes possible to facilitate dissipation of heat generated in the rotating electric machine.

In the housing of the rotating electric machine, there may be provided a heat transmission member in contact with the second coil end part of the stator coil to have heat dissipated from the second coil end part via the heat transmission member.

Consequently, with the heat transmission member, it becomes possible to further facilitate dissipation of heat generated in the rotating electric machine.

The housing may have a tubular part to which the stator core is assembled. In the tubular part of the housing, there may be formed an annular coolant passage through which coolant flows.

With the above configuration, heat transmitted from the transmission to the tubular part of the housing can be dissipated by heat exchange with the coolant flowing through the coolant passage. Moreover, transmission of heat from the transmission to the opposite axial side of the stator core to the transmission can be impeded by the coolant passage. Consequently, it becomes possible to further facilitate the dissipation of heat on the opposite axial side of the stator core to the transmission.

In the electric drive apparatus, there may be provided, on the same axial side of the stator core as the second coil end part, at least one of a rotational-state detecting unit configured to detect a rotational state of the rotor, a temperature detecting unit configured to detect a temperature of the stator coil and a control device configured to control operation of the rotating electric machine.

In the case of providing a rotational-state detecting unit, a temperature detecting unit and/or a control device in the electric drive apparatus, the performances of these devices may be affected by heat generated in the rotating electric machine. In this regard, as described above, it is easier for heat to be dissipated on the same axial side of the stator core as the second coil end part (i.e., on the opposite axial side of the stator core to the transmission) than on the same axial side of the stator core as the first coil end part (i.e., on the same axial side of the stator core as the transmission). Therefore, locating these devices on the same axial side of the stator core as the second coil end part, it is possible to maintain the performances of these devices and thus improve the reliability of the rotating electric machine.

One exemplary embodiment will be described hereinafter with reference to the drawings. FIG. 1 shows the overall configuration of an electric drive apparatus 1 according to the exemplary embodiment.

In the present embodiment, the electric drive apparatus 1 is designed to be used in a vehicle. It should be noted that the electric drive apparatus 1 may also be used for other applications, such as industrial, marine, aviation and household applications.

As shown in FIG. 1, the electric drive apparatus 1 according to the present embodiment includes a rotating electric machine 10 and a transmission 60 that are formed integrally with each other.

In the present embodiment, the rotating electric machine 10 is configured as an inner rotor type multi-phase AC motor. In addition, the rotating electric machine 10 may be either a synchronous motor or an induction motor.

Hereinafter, the direction in which the central axis of a rotating shaft 11 of the rotating electric machine 10 extends will be referred to as axial direction; the directions of extending radially from the central axis of the rotating shaft 11 will be referred to as radial directions; and the direction of extending along a circle whose center is on the central axis of the rotating shaft 11 will be referred to as circumferential direction.

The rotating electric machine 10 includes a rotating shaft 11, a rotor 12 provided on the rotating shaft 11 so as to rotate together with the rotating shaft 11, a stator 13 located radially outside the rotor 12 so as to surround the rotor 12, and a housing 14 that receives both the rotor 12 and the stator 13 therein.

The rotor 12 and the stator 13 are coaxially arranged to radially face each other. The housing 14 is provided to surround both the rotor 12 and the stator 13 from the radially outer side and both axial sides thereof.

Specifically, the housing 14 has a tubular part 15 and a cover 16. The tubular part 15 is bottomed cylindrical in shape. The tubular part 15 has an end wall 17 formed at one axial end thereof, with the other axial end thereof open. The tubular part 15 is arranged to surround the rotor 12 and the stator 13 from the radially outer side thereof, with the end wall 17 covering them from one axial side thereof. The cover 16 is fixed to the open axial end of the tubular part 15 by fixing means (not shown) such as bolts, so as to cover the rotor 12 and the stator 13 from the other axial side thereof. In addition, the end wall 17 of the tubular part 15 is located on the same axial side of the rotor 12 and the stator 13 as the transmission 60 whereas the cover 16 is located on the opposite axial side of the rotor 12 and the stator 13 to the transmission 60.

A bearing 21 is fixed to the cover 16 of the housing 14. On the other hand, a bearing 22 is fixed to the end wall 17 of the tubular part 15 of the housing 14. The rotating shaft 11 is provided to extend through both a through-hole formed in a central part of the cover 16 and a through-hole formed in a central part of the end wall 17 of the tubular part 15.

Both the rotating shaft 11 and the rotor 12 are together rotatably supported by the housing 14 via the bearings 21 and 22.

The rotor 12 includes a rotor core, which is formed by laminating a plurality of magnetic steel sheets in the axial direction and fixed on the rotating shaft 11, and a plurality of permanent magnets retained in the rotor core.

The stator 13 is located radially outside the rotor 12 so as to radially face the rotor 12 through a predetermined air gap formed therebetween. The stator 13 includes an annular stator core 31 and a multi-phase stator coil 32. The stator core 31 is formed by laminating a plurality of annular magnetic steel sheets in the axial direction and fixing them together by, for example, staking. The stator coil 32 is, for example, a three-phase coil which includes a U-phase winding, a V-phase winding and a W-phase winding. The U-phase, V-phase and W-phase windings are star-connected (i.e., Y-connected) to define a neutral point therebetween. The stator coil 32 is assembled to the stator core 31 so as to have annular first and second coil end parts 33A and 33B respectively protruding from an opposite pair of first and second axial end faces of the stator core 31.

The stator 13 is fixed to the housing 14 with the stator core 31 fitted into the radially inner side of the tubular part 15 of the housing 14. In addition, the stator core 31 may be interference-fitted to the radially inner periphery of the tubular part 15 of the housing 14 by, for example, shrink fitting or press fitting.

In the tubular part 15 of the housing 14, there is formed an annular coolant passage 24 through which coolant flows. Specifically, the coolant passage 24 is formed so that the coolant flows in the circumferential direction between an inlet and an outlet both of which are not shown in the figures. Moreover, the coolant passage 24 is located in the axial direction to radially overlap the stator core 31.

In addition, in the present embodiment, the coolant is implemented by cooling water. It should be noted that the coolant may alternatively be implemented by, for example, lubricating oil.

In the rotating electric machine 10, there is provided a rotation angle sensor 25 that functions as a rotational-state detecting unit to detect the rotational state of the rotor 12. The rotation angle sensor 25 is of an electromagnetic induction type which is configured with, for example, a resolver. The resolver includes a resolver rotor fixed to the rotating shaft 11 and a resolver stator that is arranged radially outside the resolver rotor so as to radially face the resolver rotor. More specifically, the resolver rotor is formed of a laminated flat plate. The resolver rotor is arranged coaxially with the rotating shaft 11 which extends through the resolver rotor in the axial direction. On the other hand, the resolver stator is fixed to the cover 16 of the housing 14. The resolver stator includes a stator core and a stator coil, both of which are not shown in the figures.

In the rotating electric machine 10 configured as described above, energization of the stator coil 32 is controlled by an inverter and a controller both of which are not shown in the figures. Consequently, by controlling energization of the stator coil 32, it is possible to control torque acting on the rotating shaft 11 during operation of the rotating electric machine 10 in a torque generation mode or in an electric power generation mode.

Figure 2:
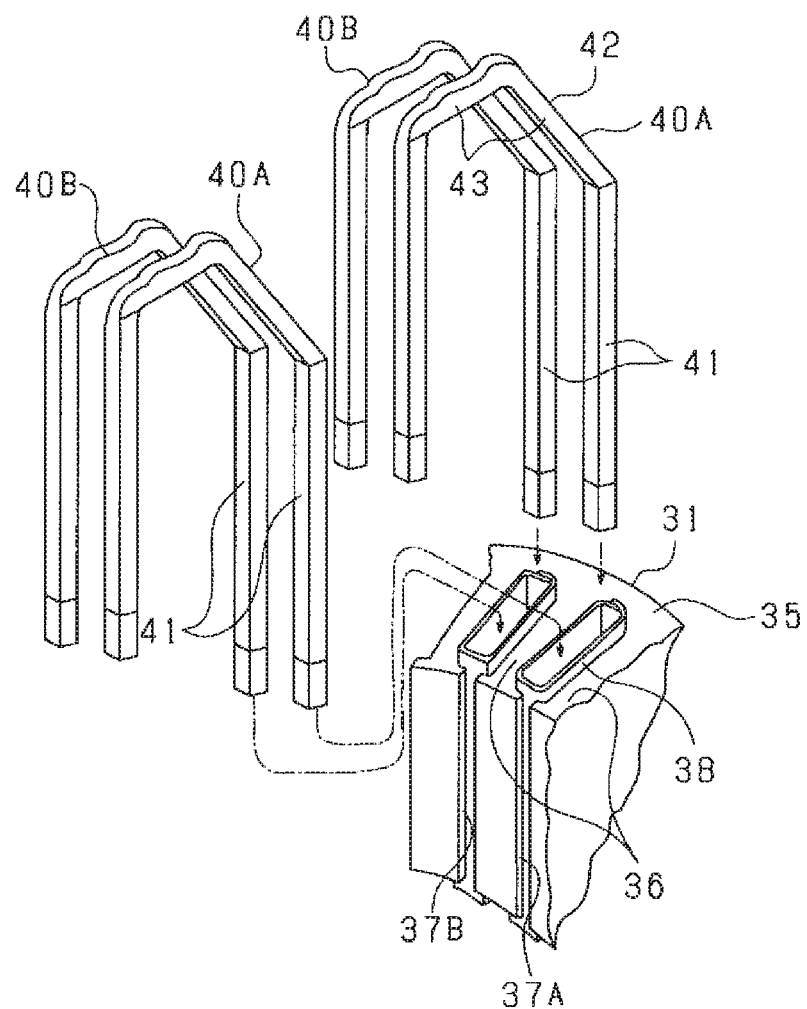
FIG. 2 is a schematic view illustrating the manner of assembling electrical conductor segments forming a stator coil to a stator core, the stator coil and the stator core together constituting a stator of the rotating electric machine.

In the present embodiment, the stator coil 32 is formed by first assembling a plurality of substantially U-shaped electrical conductor segments 40 as shown in FIG. 2 to the stator core 31 and then joining each corresponding pair of distal end portions of the electrical conductor segments 40 by welding.

Figure 3:
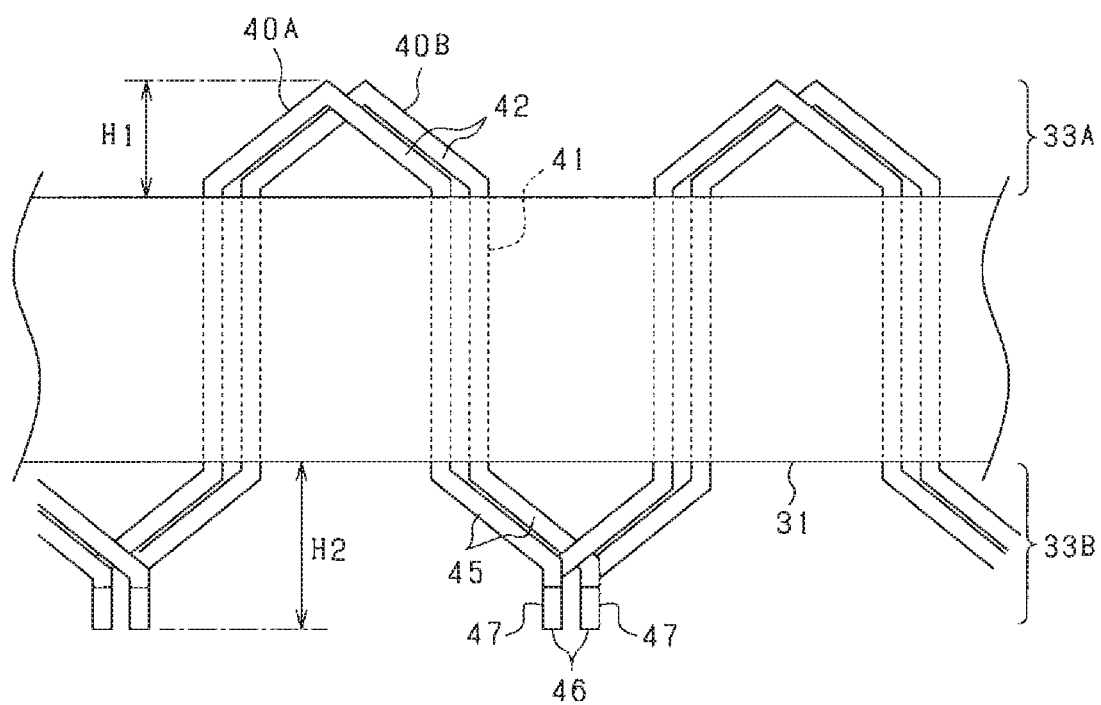
FIG. 3 is a developed view, in a circumferential direction, of part of the stator.

FIG. 2 illustrates the manner of assembling the electrical conductor segments 40 to the stator core 31. FIG. 3 illustrates the electrical conductor segments 40 having been assembled to the stator core 31. It should be noted that for the sake of simplicity, in FIG. 3, there are shown only those of the electrical conductor segments 40 which are joined to each other to form one of the U-phase, V-phase and W-phase windings of the stator coil 32.

As shown in FIG. 2, the stator core 31 includes an annular back core 35 and a plurality of teeth 36 that each protrude radially inward from the back core 35 and are circumferentially spaced at a predetermined pitch. The stator core 31 also has a plurality of slots 37 each of which is formed between one circumferentially-adjacent pair of the teeth 36.

The slots 37 are comprised of U-phase slot groups, V-phase slot groups and W-phase slot groups which are sequentially and repeatedly arranged in the circumferential direction; each slot group including a predetermined number of the slots 37. More particularly, in the present embodiment, the slots 37 are comprised of pairs of U-phase slots 37A and 37B, V-phase slots 37A and 37B and W-phase slots 37A and 37B which are sequentially and repeatedly arranged in the circumferential direction.

For each of the slots 37, the depth direction of the slot 37 coincides with a radial direction of the stator core 31. Moreover, each of the slots 37 partially opens on a radially inner surface of the stator core 31. In addition, each of the slots 37 is formed to have a predetermined number of the electrical conductor segments 40 arranged therein in alignment with each other in the depth direction thereof (i.e., the radial direction of the stator core 31).

As shown in FIG. 2, each of the electrical conductor segments 40 is substantially U-shaped to have a pair of straight portions 41 extending parallel to each other and a turn portion 42 formed by bending to connect ends of the straight portions 41 on the same side. The straight portions 41 have a length greater than the axial thickness of the annular stator core 31. The turn portion 42 has a pair of oblique parts 43 formed respectively on opposite sides of the center of the turn portion 42 so as to extend obliquely at a predetermined angle with respect to the first axial end face (i.e., the upper end face in FIGS. 2 and 3) of the stator core 31.

In the present embodiment, the electrical conductor segments 40 are obtained by cutting and plastically deforming an electric wire that includes an electrical conductor and an insulating coat. The electrical conductor is formed of an electrically conductive metal (e.g., copper) and has a substantially rectangular cross section. The insulating coat is formed of an electrically insulative resin and provided to cover the outer surface of the electrical conductor.

The electrical conductor segments 40 are arranged in a predetermined number of radially-aligned layers in each of the slots 37 of the stator core 31. Each of the electrical conductor segments 40 has one of the straight portions 41 thereof arranged at the nth layer counting from the radially inner side in one of the slots 37 and the other of the straight portions 41 thereof arranged at the (n+1)th layer counting from the radially inner side in another one of the slots 37, where n is a natural number greater than or equal to 1.

More particularly, in the present embodiment, as mentioned previously, the slots 37 of the stator core 31 are comprised of a plurality of slot pairs each consisting of a first slot 37A and a second slot 37B; the first and second slots 37A and 37B are circumferentially adjacent to each other and belong to the same phase (i.e., the same one of the U, V and W phases). On the other hand, the electrical conductor segments 40 forming the stator coil 32 are comprised of a plurality of electrical conductor segment pairs each consisting of a first electrical conductor segment 40A and a second electrical conductor segment 40B; the first and second electrical conductor segments 40A and 40B have the same shape and size.

For each electrical conductor segment pair, the straight portions 41 of the first electrical conductor segment 40A are inserted, from a first axial side (i.e., the upper side in FIGS. 2 and 3) of the stator core 31, respectively into the first slot 37A of a first slot pair and the first slot 37A of a second slot pair; the straight portions 41 of the second electrical conductor segment 40B are inserted, from the first axial side of the stator core 31, respectively into the second slot 37B of the first slot pair and the second slot 37B of the second slot pair. That is, the first and second electrical conductor segments 40A and 40B are circumferentially offset from each other by one slot pitch. Moreover, the first slot pair and the second slot pair are located away from each other by one magnetic pole pitch (or six slot-pitches in the present embodiment). In addition, in each of the slots 37 of the stator core 31, there is provided one insulating sheet 38 to electrically insulate between the stator core 31 and the stator coil 32 (i.e., the electrical conductor segments 40).

After the insertion of the straight portions 41 of the electrical conductor segments 40 into the corresponding slots 37 of the stator core 31, for each of the electrical conductor segments 40, protruding parts of the straight portions 41 of the electrical conductor segment 40, which protrude outside the corresponding slots 37 on a second axial side (i.e., the lower side in FIGS. 2 and 3) of the stator core 31, are twisted respectively toward opposite sides in the circumferential direction so as to extend obliquely at a predetermined angle with respect to the second axial end face (i.e., the lower end face in FIGS. 2 and 3) of the stator core 31. Consequently, each of the protruding parts of the straight portions 41 is transformed into an oblique part 45 of the electrical conductor segment 40; the oblique part 45 extends in the circumferential direction of the stator core 31 for substantially half a magnetic pole pitch.

Then, as shown in FIG. 3, on the second axial side of the stator core 31, each corresponding pair of distal end portions 47 of the electrical conductor segments 40 (i.e., end portions 47 of the electrical conductor segments 40 on the opposite side to the turn portions 42) are joined (e.g., by welding), forming a joint (or weld) 46 therebetween. Consequently, all the electrical conductor segments 40 are electrically connected in a predetermined pattern, thereby forming the stator coil 32.

More specifically, the distal end portions 47 of the electrical conductor segments 40 are exposed from the respective insulating coats, forming exposed portions 47 of the electrical conductor segments 40. Each of the joints 46 is formed between one corresponding pair of the exposed portions 47 of the electrical conductor segments 40.

As shown in FIG. 3, the stator coil 32, which is assembled to the stator core 31 in the above-described manner, has the first coil end part 33A located on the first axial side (i.e., the upper side in FIG. 3) of the stator core 31 and the second coil end part 33B located on the second axial side (i.e., the lower side in FIG. 3) of the stator core 31. The first coil end part 33A is constituted of the turn portions 42 of the electrical conductor segments 40 which protrude from the first axial end face (i.e., the upper end face in FIG. 3) of the stator core 31. The second coil end part 33B is constituted of the oblique parts 45 of the electrical conductor segments 40, which protrude from the second axial end face (i.e., the lower end face in FIG. 3) of the stator core 31, and the joints 46 formed between the exposed portions 47 of the electrical conductor segments 40. In addition, as shown in FIG. 3, the joints 46 are formed to extend substantially parallel to the axial direction.

With the above configuration of the stator coil 32 according to the present embodiment, the axial protruding heights of the first and second coil end parts 33A and 33B respectively from the first and second axial end faces of the stator core 31 are different from each other.

More specifically, in the present embodiment, the following dimensional relationship is satisfied: H1<H2, where H1 is the axial protruding height of the first coil end part 33A from the first axial end face of the stator core 31 and H2 is the axial protruding height of the second coil end part 33B from the second axial end face of the stator core 31.

As described above, in the present embodiment, the first coil end part 33A is constituted of the turn portions 42 of the electrical conductor segments 40 whereas the second coil end part 33B is constituted of the oblique parts 45 of the electrical conductor segments 40 and the joints 46 formed between the distal end portions 47 (i.e., the exposed portions 47) of the electrical conductor segments 40. In the second coil end part 33B, it is necessary to superpose and join each corresponding pair of the distal end portions 47 of the electrical conductor segments 40. Consequently, the axial protruding height H2 of the second coil end part 33B becomes larger than the axial protruding height H1 of the first coil end part 33A.

In particular, in the case of joining each corresponding pair of the distal end portions 47 of the electrical conductor segments 40 by welding, it is necessary to secure a sufficiently long distance from the stator core 31 to the distal end portions 47 during the welding process; it is also necessary to secure a sufficient weld zone at the distal end portions 47 of the electrical conductor segments 40. Consequently, the axial protruding height H2 of the second coil end part 33B becomes considerably larger than the axial protruding height H1 of the first coil end part 33A.

In addition, the left-right direction in FIG. 1 coincides with the axial direction; the first and second coil end parts 33A and 33B respectively denote the left and right coil end parts of the stator coil 32 in FIG. 1.

In the present embodiment, there is provided, on the same axial side of the stator core 31 as the second coil end part 33B (i.e., on the right side of the stator core 31 in FIG. 1), a neutral joint 51 at which end portions of the U-phase, V-phase and W-phase windings of the stator coil 32 are joined together to define the neutral point of the stator coil 32. More specifically, as shown in FIG. 1, at the neutral joint 51, the end portions of the U-phase, V-phase and W-phase windings of the stator coil 32 are superposed along the axial direction and joined together by, for example, welding.

Moreover, in the present embodiment, there are also provided, on the same axial side of the stator core 31 as the second coil end part 33B, busbars 52 through which electric power is inputted to and outputted from the U-phase, V-phase and W-phase windings of the stator coil 32. Each of the busbars 52 is provided for a corresponding one of the phase windings of the stator coil 32. More specifically, each of the busbars 52 is connected with an end portion of the corresponding phase winding on the opposite side to the neutral point. In addition, all the busbars 52 may be integrated, for example by resin molding, into a busbar module.

In the cover 16 of the housing 14, there is formed a through-hole 53 through which parts of the busbars 52 protrude outside the housing 14. To the protruding parts of the busbars 52, there is connected an electric power harness 54 provided for inputting/outputting electric power to/from the stator coil 32. Moreover, in the through-hole 53, there is filled a sealant to seal the gap between the busbars 52 and the interior wall surface of the through-hole 53.

In addition, as an alternative, the busbars 52 may be configured to extend within the housing 14 and be connected with a terminal member; the terminal member may extend from the inside to the outside of the housing 14 through the through-hole 53 formed in the cover 16 of the housing 14.

The electric drive apparatus 1 according to the present embodiment is configured to be used as a motive power source in a vehicle to generate motive power (or torque) for rotating left and right wheels of the vehicle.

Specifically, the motive power generated by the rotating electric machine 10 is transmitted to the wheels of the vehicle via the transmission 60, thereby enabling the vehicle to run. In particular, in the present embodiment, a differential 62 is provided in the transmission 60 to divide the motive power between the left and right wheels of the vehicle.

As shown in FIG. 1, the transmission 60 includes a motive power transmitting unit 61 for transmitting the motive power generated by the rotating electric machine 10, the aforementioned differential 62, and a housing 63 that receives both the motive power transmitting unit 61 and the differential 62 therein. In the housing 63, there is provided lubricating oil for lubricating both the motive power transmitting unit 61 and the differential 62.

The housing 63 has a flat end wall 63a provided at one axial end thereof. The end wall 63a of the housing 63 of the transmission 60 and the end wall 17 of the housing 14 of the rotating electric machine 10 are arranged to abut each other and joined together by joining means such as bolts. That is, the housing 63 of the transmission 60 is provided, on one axial side (i.e., the left side in FIG. 1) of the rotating electric machine 10, integrally with the housing 14 of the rotating electric machine 10 into one piece. Consequently, the rotating electric machine 10 and the transmission 60 are integrated into a unitary structure (or mechanically joined together into a single body).

The transmission 60 has a rotation inputting portion 64 provided integrally with the rotating shaft 11 of the rotating electric machine 10 so as to rotate together with the rotating shaft 11. The rotation of the rotating shaft 11 is inputted to the transmission 60 via the rotation inputting portion 64; then the rotation is outputted from a pair of output shafts 65A and 65B of the transmission 60 via the motive power transmitting unit 61 and the differential 62. More specifically, the rotation inputted via the rotation inputting portion 64 is increased or decreased in speed in the transmission 60 and then outputted from the output shafts 65A and 65B. With the rotation of the output shafts 65A and 65B, the left and right wheels of the vehicle also rotate.

It should be noted that FIG. 1 only schematically illustrates the configuration of the electric drive apparatus 1 where: the rotating electric machine 10 and the transmission 60 are coaxially arranged; and the output shaft 65A, which is one of the pair of output shafts 65A and 65B of the transmission 60, is configured to extend through a hollow portion 11a of the rotating shaft 11.

Though not shown in detail in FIG. 1, the rotating shaft 11 is inserted in both the through-hole formed in the end wall 17 of the housing 14 of the rotating electric machine 10 and a through-hole formed in the end wall 63a of the housing 63 of the transmission 60. Moreover, seal members (e.g., sliding seals) are provided between the outer circumferential surface of the rotating shaft 11 and the interior wall surfaces of the through-holes formed in the end walls 17 and 63a of the housings 14 and 63. Consequently, with the seal members, it becomes possible to isolate the internal space of the housing 14 of the rotating electric machine 10 and the internal space of the housing 63 of the transmission 60 from each other while allowing the rotating shaft 11 to rotate. In addition, in the housing 63 of the transmission 60, there may be formed an oil drain hole through which the amount of the lubricating oil provided in the housing 63 can be adjusted.

Next, the configuration of the transmission 60 according to the present embodiment will be described in detail with reference to FIG. 4.

In the present embodiment, the motive power transmitting unit 61 of the transmission 60 is implemented by a double-pinion planetary gear mechanism 70. The planetary gear mechanism 70 includes a ring gear 71 having internal teeth formed therein, a sun gear 72 having external teeth formed therein, a pair of pinion gears 73 and 74 arranged coaxially with each other, and a carrier 75 rotatably supporting the pair of pinion gears 73 and 74. The ring gear 71 is fixed to the housing 63 of the transmission 60. The sun gear 72 may be provided, as the rotation inputting portion 64 of the transmission 60, integrally with the rotating shaft 11 so as to rotate together with the rotating shaft 11. Of the pair of pinion gears 73 and 74, the pinion gear 73 is arranged to mesh with the ring gear 71 while the pinion gear 74 is arranged to mesh with the sun gear 72. The carrier 75 is fixed to a case 81 of the differential 62.

It should be noted that the planetary gear mechanism 70 may alternatively include a plurality of pairs of pinion gears 73 and 74. Moreover, it also should be noted that the rotation inputting portion 64 may alternatively be constituted of a spline and the sun gear 72 may be fixed to the spline.

The differential 62 includes the aforementioned case 81, a plurality of pinion gears 82 provided in the case 81, and a pair of side gears 83 provided in the case 81 and joined respectively to the output shafts 65A and 65B by spline fitting, press fitting or the like.

Moreover, in the transmission 60, the rotating shaft 11 is rotatably supported by a bearing 85. The carrier 75 of the planetary gear mechanism 70 is rotatably supported by a bearing 86. The case 81 of the differential 62 is rotatably supported by a bearing 87.

In the transmission 60 configured as described above, during rotation of the rotating shaft 11 (i.e., during rotation of the rotor 12), the pinion gears 73 and 74 rotate with rotation of the sun gear 72. Further, with the rotation of the pinion gears 73 and 74, the carrier 75 rotates together with the case 81 of the differential 62. That is, the rotation of the rotating shaft 11 is transmitted to the case 81 of the differential 62 through speed reduction by the planetary gear mechanism 70 at a given reduction ratio. Moreover, the rotation of the case 81 of the differential 62 is further transmitted to the output shafts 65A and 65B through the mesh between the pinion gears 82 and the side gears 83. When the output shafts 65A and 65B rotate at different speeds during the traveling of the vehicle around a corner, the motive power is suitably divided by the differential 62 between the output shafts 65A and 65B and thus between the left and right wheels of the vehicle.

In the electric drive apparatus 1 according to the present embodiment, the transmission 60 is provided, on one axial side (i.e., the left side in FIG. 1) of the rotating electric machine 10, integrally with the rotating electric machine 10 into a unitary structure. Therefore, it is more difficult for heat generated in the rotating electric machine 10 to be dissipated on the axial side where the transmission 60 is provided than on the opposite axial side to the transmission 60. In view of the above, in the present embodiment, the following measures are taken to facilitate dissipation of heat generated in the rotating electric machine 10.

As described above, in the stator 13 of the rotating electric machine 10, the axial protruding heights H1 and H2 of the first and second coil end parts 33A and 33B of the stator coil 32 respectively from the first and second axial end faces of the stator core 31 are different from each other. More specifically, the axial protruding height H2 of the second coil end part 33B from the second axial end face of the stator core 31 is larger than the axial protruding height H1 of the first coil end part 33A from the first axial end face of the stator core 31 (see FIG. 3). Therefore, in the present embodiment, the rotating electric machine 10 is assembled to the transmission 60 so that the first coil end part 33A is located on the same axial side of the stator core 31 as the transmission 60 (i.e., on the left side of the stator core 31 in FIG. 1) whereas the second coil end part 33B is located on the opposite axial side of the stator core 31 to the transmission 60 (i.e., on the right side of the stator core 31 in FIG. 1). Consequently, it becomes possible to more effectively dissipate heat generated in the rotating electric machine 10 than in the case of locating the first coil end part 33A on the opposite axial side of the stator core 31 to the transmission 60.

More specifically, the surface area of the second coil end part 33B is larger than the surface area of the first coil end part 33A; thus more heat can be released from the second coil end part 33B than from the first coil end part 33A. Moreover, the amount of heat generated in the second coil end part 33B is larger than the amount of heat generated in the first coil end part 33A. On the other hand, it is easier for heat to be dissipated from the rotating electric machine 10 to the outside on the opposite axial side of the stator core 31 to the transmission 60 than on the same axial side of the stator core 31 as the transmission 60. Therefore, locating the second coil end part 33B on the opposite axial side of the stator core 31 to the transmission 60, it becomes possible to facilitate dissipation of heat generated in the rotating electric machine 10 in comparison with the case of locating the first coil end part 33A on the opposite axial side of the stator core 31 to the transmission 60.

In particular, the second coil end part 33B includes the joints 46; at each of the joints 46, one corresponding pair of the distal end portions 47 (i.e., the exposed portions 47) of the electrical conductor segments 40 are superposed on and joined to each other. Consequently, the axial protruding height H2 of the second coil end part 33B from the second axial end face of the stator core 31 becomes larger than the axial protruding height H1 of the first coil end part 33A from the first axial end face of the stator core 31. Therefore, in terms of dissipation of heat generated in the rotating electric machine 10, locating the second coil end part 33B on the opposite axial side of the stator core 31 to the transmission 60 is more advantageous than locating the first coil end part 33A on the opposite axial side of the stator core 31 to the transmission 60.

Moreover, when each corresponding pair of the distal end portions 47 of the electrical conductor segments 40 are joined by welding, to suppress the influence of heat applied during the welding process, it is necessary to secure a sufficiently long distance from the stator core 31 to the distal end portions 47. Consequently, the distance from the stator core 31 to the resultant weld (i.e., joint 46) becomes long, increasing the axial protruding height H2 of the second coil end part 33B.

Moreover, in the present embodiment, there are provided, on the same axial side of the stator core 31 as the second coil end part 33B, the neutral joint 51 defining the neutral point of the stator coil 32 as well as the busbars 52 connected respectively with the phase windings of the stator coil 32. Consequently, on the opposite axial side of the stator core 31 to the transmission 60, heat generated with supply of electric power to the stator coil 32 can be dissipated also via the neutral joint 51 and the busbars 52.

According to the present embodiment, it is possible to achieve the following advantageous effects.

The electric drive apparatus 1 according to the present embodiment includes the rotating shaft 10 and the transmission 60. The rotating electric machine 10 includes the rotor 12, the stator 13 and the housing 14. The rotor 12 is provided on the rotating shaft 11 so as to rotate together with the rotating shaft 11. The stator 13 includes the annular stator core 31 and the three-phase stator coil 32. The housing 14 has both the rotor 12 and the stator 13 received therein. The transmission 60 includes the motive power transmitting unit 61 that is configured to rotate with rotation of the rotating shaft 11. Moreover, in the electric drive apparatus 1, the transmission 60 is provided, on one axial side (i.e., the left side in FIG. 1) of the rotating electric machine 10, integrally with the rotating electric machine 10 into a unitary structure. The stator coil 32 is assembled to the stator core 31 to have the first and second coil end parts 33A and 33B respectively protruding from the first and second axial end faces of the stator core 31. The axial protruding height H2 of the second coil end part 33B from the second axial end face of the stator core 31 is larger than the axial protruding height H1 of the first coil end part 33A from the first axial end face of the stator core 31. The first coil end part 33A is located on the same axial side of the stator core 31 as the transmission 60 whereas the second coil end part 33B is located on the opposite axial side of the stator core 31 to the transmission 60.

With the above configuration, it becomes possible to more effectively dissipate heat generated in the rotating electric machine 10 than in the case of locating the first coil end part 33A on the opposite axial side of the stator core 31 to the transmission 60.

Moreover, with the above configuration, the axial length of the rotating electric machine 10 remains unchanged in comparison with the case of locating the first coil end part 33A on the opposite axial side of the stator core 31 to the transmission 60 (i.e., locating the second coil end part 33B on the same axial side of the stator core 31 as the transmission 60). Consequently, it becomes possible to suppress increase in the size of the rotating electric machine 10 and thus increase in the size of the entire electric drive apparatus 1.

Accordingly, with the above configuration, it becomes possible to suitably dissipate heat generated in the rotating electric machine 10 while suppressing increase in the size of the electric drive apparatus 1.

In addition, the thermal rating of the stator coil 32 is designed within a range such that the maximum temperature in the stator coil 32 does not exceed the heat-resistant temperature of the insulating coats of the electrical conductor segments 40 forming the stator coil 32. In this regard, by effectively dissipating heat generated with supply of electric power to the stator coil 32, it is possible to increase the upper limit of the output of the rotating electric machine 10.

In the present embodiment, the stator coil 32 is comprised of the U-phase, V-phase and W-phase windings. Each of the phase windings of the stator coil 32 has the turn portions 42 formed by bending and the joints 46 at each of which two sections of the phase winding (more particularly, two electrical conductor segments 40 forming the phase winding in the present embodiment) are joined together by welding. The turn portions 42 are included in the first coil end part 32A whereas the joints 46 are included in the second coil end part 32B.

With the above configuration, in the second coil end part, it is necessary to superpose and join each corresponding pair of the distal end portions 47 of the electrical conductor segments 40. Consequently, the axial protruding height H2 of the second coil end part 33B becomes larger than the axial protruding height H1 of the first coil end part 33A. In particular, in the case of joining each corresponding pair of the distal end portions 47 of the electrical conductor segments 40 by welding, to suppress the influence of heat applied during the welding process, it is necessary to secure a sufficiently long distance from the stator core 31 to the distal end portions 47; it is also necessary to secure a sufficient weld zone at the distal end portions 47 of the electrical conductor segments 40. Consequently, the axial protruding height H2 of the second coil end part 33B becomes considerably larger than the axial protruding height H1 of the first coil end part 33A. As a result, it becomes possible to further facilitate dissipation of heat generated in the rotating electric machine 10.

In addition, at the welds (i.e., joints 46) included in the second coil end part 32B, fatigue may occur due to repeatedly applied thermal stress. Moreover, the amount of generated heat may be increased due to change in the electrical conductivity caused by the welding. In this regard, locating the second coil end part 33B on the opposite axial side of the stator core 31 to the transmission 60, it becomes possible to facilitate cooling of the welds, thereby preventing rapid increase in the temperature. Consequently, it becomes possible to suppress occurrence of a fault condition (e.g., fatigue) at the welds.

In the present embodiment, each of the U-phase, V-phase and W-phase windings of the stator coil 32 is formed of a plurality of electrical conductor segments 40. In other words, for each of the phase windings of the stator coil 32, the sections of the phase winding, which are joined to one another at the joints 46, are respectively formed of the electrical conductor segments 40. Each of the electrical conductor segments 40 is substantially U-shaped to have the pair of straight portions 41 extending parallel to each other and one of the turn portions 42 of the phase winding which extends, on the same axial side of the stator core 31 as the transmission 60, to connect the pair of straight portions 41. Each corresponding pair of the distal end portions 47 of the electrical conductor segments 40 are joined together at one of the joints 46 on the opposite axial side of the stator core 31 to the transmission 60.

With the above configuration, it becomes possible to easily and reliably realize the axial protruding height H2 of the second coil end part 33B from the second axial end face of the stator core 31 being larger than the axial protruding height H1 of the first coil end part 33A from the first axial end face of the stator core 31. Consequently, it becomes possible to easily and reliably realize the facilitation of dissipation of heat generated in the rotating electric machine 10.

In addition, forming each of the phase coils of the stator coil 32 with the electrical conductor segments 40, the space factor of the stator coil 32 in the stator 13 may be improved and thus the amount of heat generated in the rotating electric machine 10 may be increased with improvement in the output density thereof. However, even in this case, it is still possible to suitably dissipate heat generated in the rotating electric machine 10 by facilitating the dissipation of heat at the second coil end part 33B.

In the present embodiment, there is provided, on the same axial side of the stator core 31 as the second coil end part 33B, the neutral joint 51 at which the end portions of the phase windings of the stator coil 32 are joined together to define the neutral point of the stator coil 32.

Since the neutral joint 51 is located distantly from the stator core 31, it may be difficult for heat to be dissipated from the neutral joint 51 and thus it may be easy for temperature to increase at the neutral joint 51. However, locating the neutral joint 51 on the same axial side of the stator core 31 as the second coil end part 33B, i.e., on the opposite axial side of the stator core 31 to the transmission 60, it is possible to facilitate dissipation of heat from the neutral joint 51.

In the present embodiment, there are provided, on the same axial side of the stator core 31 as the second coil end part 33B, the busbars 52 through each of which electric power is inputted to and outputted from one of the phase windings of the stator coil 32. The housing 14 of the rotating electric machine 10 has the cover 16 arranged to cover the second coil end part 33B. In the cover 16 of the housing 14, there is formed the through-hole 53 through which each of the busbars 52 (alternatively a terminal member connected with the busbars 52) extends from the inside to the outside of the housing 14.

With the above configuration, it is easy for heat to be released from the busbars 52. Consequently, heat can be dissipated from the second coil end part 33B to the outside of the housing 14 via the busbars 52. As a result, it becomes possible to facilitate dissipation of heat generated in the rotating electric machine 10.

In the present embodiment, the housing 14 has the tubular part 15 to which the stator core 31 is assembled. In the tubular part 15 of the housing 14, there is formed the annular coolant passage 24 through which the coolant flows.

With the above configuration, heat transmitted from the transmission 60 to the tubular part 15 of the housing 14 can be dissipated by heat exchange with the coolant flowing through the coolant passage 24. Moreover, transmission of heat from the transmission 60 to the opposite axial side of the stator core 31 to the transmission 60 is impeded by the coolant passage 24. Consequently, it becomes possible to further facilitate the dissipation of heat on the opposite axial side of the stator core 31 to the transmission 60.

In the present embodiment, there is provided, on the same axial side of the stator core 31 as the second coil end part 33B, the rotation angle sensor 25 that functions as a rotational-state detecting unit to detect the rotational state of the rotor 12.

As described above, it is easier for heat to be dissipated on the same axial side of the stator core 31 as the second coil end part 33B (i.e., on the opposite axial side of the stator core 31 to the transmission 60) than on the same axial side of the stator core 31 as the first coil end part 33A (i.e., on the same axial side of the stator core 31 as the transmission 60). Therefore, locating the rotation angle sensor 25 on the same axial side of the stator core 31 as the second coil end part 33B, it becomes possible to maintain the performance of the rotation angle sensor 25 and thus improve the reliability of the rotating electric machine 10.

While the above particular embodiment has been shown and described, it will be understood by those skilled in the art that various modifications, changes and improvements may be made without departing from the spirit of the present disclosure.

Figure 4:
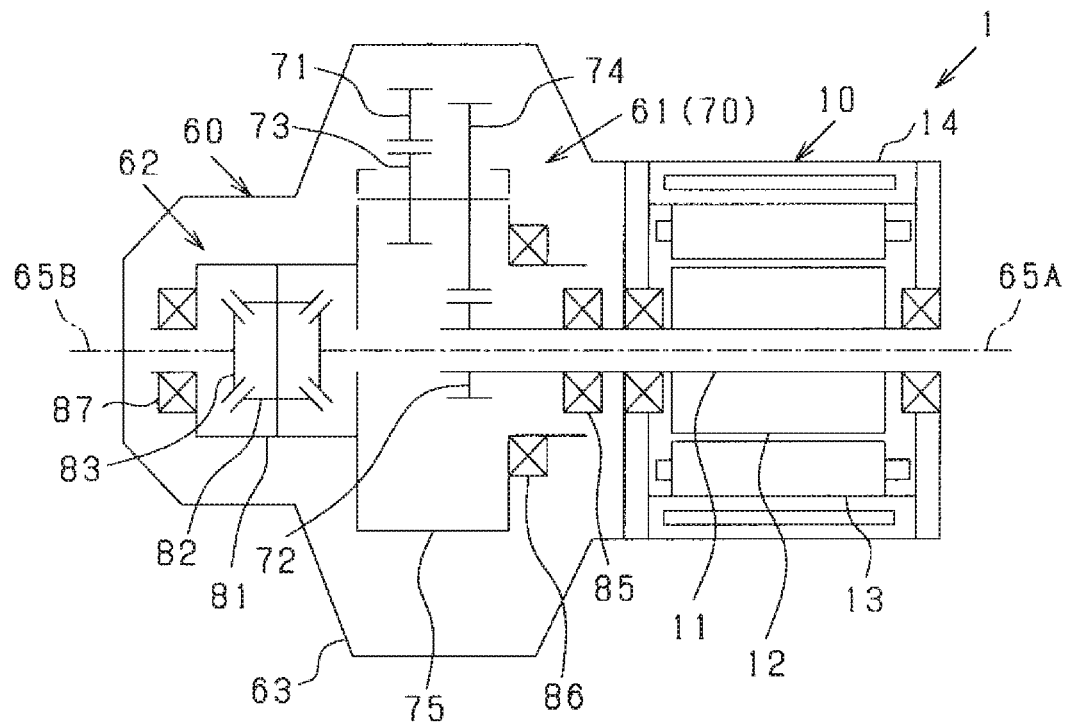
FIG. 4 is a schematic diagram illustrating the configuration of the transmission according to the exemplary embodiment.

(1) For example, in the above-described embodiment, the transmission 60 is configured as shown in FIG. 4.

Figure 5:
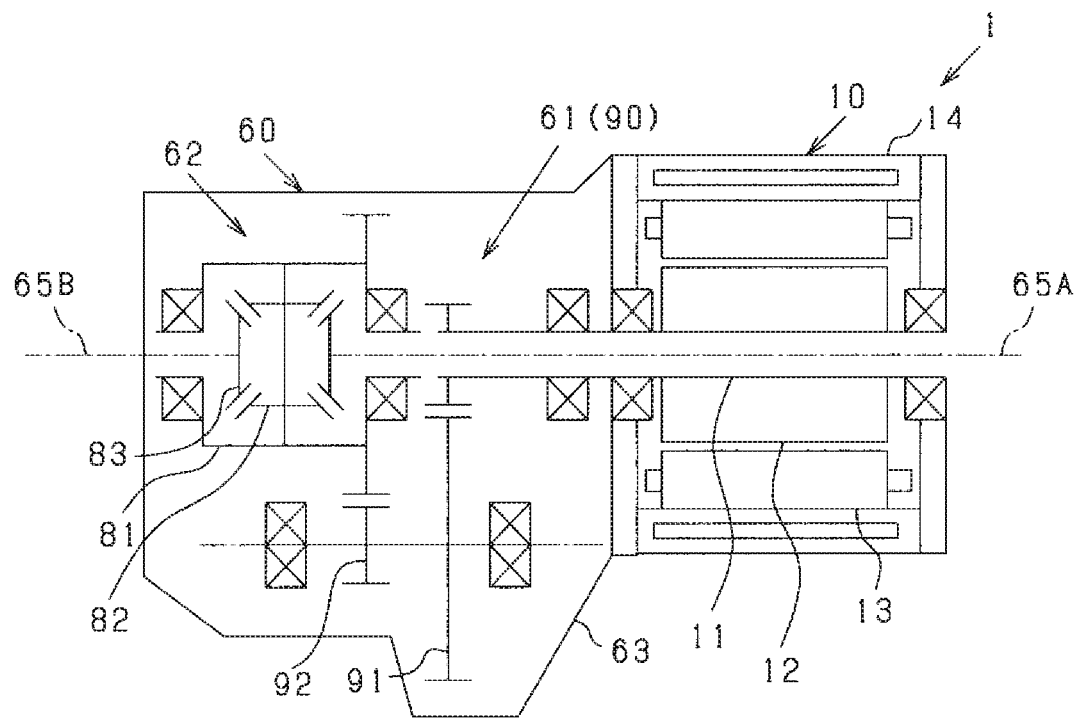
FIG. 5 is a schematic diagram illustrating the configuration of a transmission according to a modification.

As an alternative, the transmission 60 may have a configuration as shown in FIG. 5. In this configuration, the rotating electric machine 10 and the transmission 60 are arranged coaxially with each other. The motive power transmitting unit 61 of the transmission 60 is implemented by a helical gear mechanism 90. The helical gear mechanism 90 includes a plurality of helical gear pairs having different speed reduction ratios (this is the same in FIGS. 6 and 7 to be described later). More specifically, the helical gear mechanism 90 includes, for example, a first gear pair 91 configured to rotate with rotation of the rotating shaft 11 and a second gear pair 92 configured to make the case 81 of the differential 62 rotate with rotation of the first gear pair 91. During rotation of the rotating shaft 11 (i.e., during rotation of the rotor 12), both the gear pairs 91 and 92 also rotate, causing the pair of output shafts 65A and 65B to rotate coaxially with the rotating shaft 11.

Figure 6:
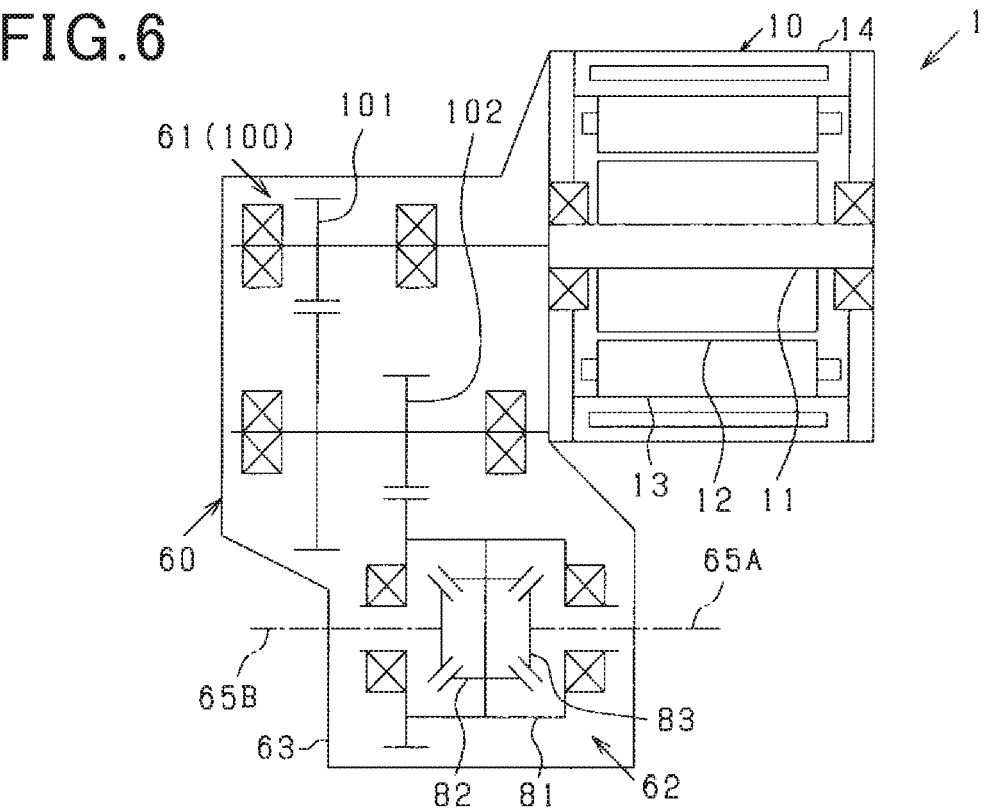
FIG. 6 is a schematic diagram illustrating the configuration of a transmission according to another modification.

As another alternative, the transmission 60 may have a configuration as shown in FIG. 6. In this configuration, the rotating electric machine 10 and the transmission 60 are of a multi-axis type. The motive power transmitting unit 61 of the transmission 60 is implemented by a helical gear mechanism 100. The helical gear mechanism 100 includes, for example, a first gear pair 101 configured to rotate with rotation of the rotating shaft 11 and a second gear pair 102 configured to make the case 81 of the differential 62 rotate with rotation of the first gear pair 101. During rotation of the rotating shaft 11 (i.e., during rotation of the rotor 12), both the gear pairs 101 and 102 also rotate, causing the pair of output shafts 65A and 65B to rotate about a different axis from the rotating shaft 11.

Figure 7:
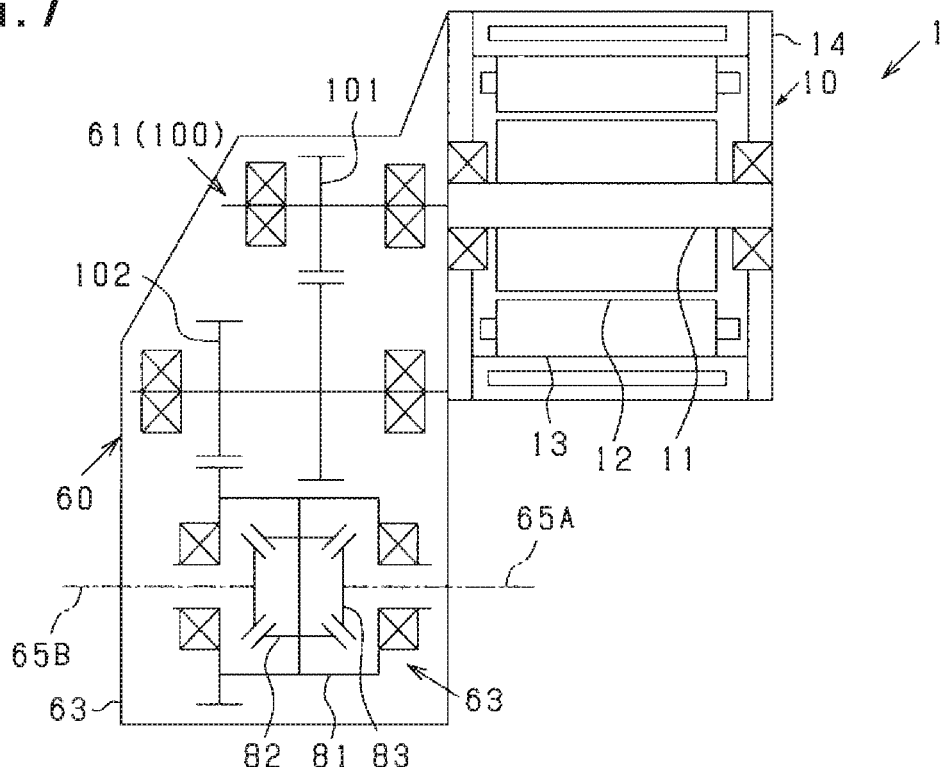
FIG. 7 is a schematic diagram illustrating the configuration of a transmission according to yet another modification.

As yet another alternative, the transmission 60 may have a configuration as shown in FIG. 7. This configuration differs from the above-described configuration shown in FIG. 6 only in the axial locations of the first and second gear pairs 101 and 102.

Figure 8:
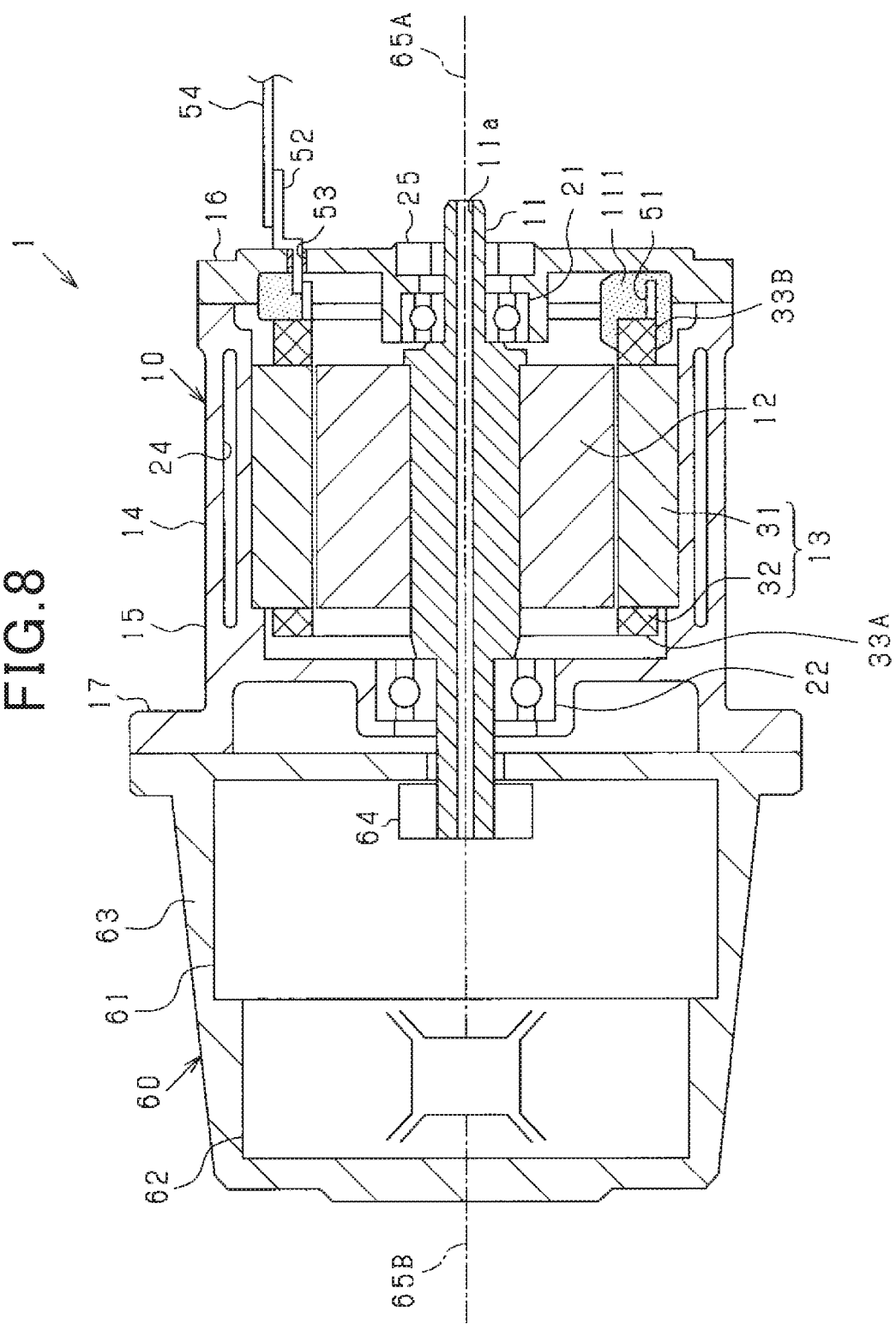
FIG. 8 is a longitudinal cross-sectional view of an electric drive apparatus according to a modification.

(2) As shown in FIG. 8, in the housing 14 of the rotating electric machine 10, there may be provided a heat transmission member 111 in intimate contact with the second coil end part 33B of the stator coil 32 so that heat is dissipated from the second coil end part 33B via the heat transmission member 111. The heat transmission member 111 may be formed of a heat transmissible material, such as silicone rubber or grease. Moreover, the heat transmission member 111 may be provided in an annular shape along the second coil end part 33B. Consequently, with the heat transmission member 111, the dissipation of heat from the second coil end part 33B is facilitated.

Furthermore, the heat transmission member 111 may be provided in intimate contact with the housing 14 as well as with the second coil end part 33B. In this case, the dissipation of heat from the second coil end part 33B is further facilitated by heat conduction from the second coil end part 33B to the housing 14 through the heat transmission member 111.

In addition, the heat transmission member 111 may be formed of coolant such as lubricating oil. For example, lubricating oil may be provided in the housing 14 to have the second coil end part 33B immersed in the lubricating oil. Alternatively, in the housing 14, with rotation of the rotating shaft 11, lubricating oil may be sprinkled from the rotating shaft 11 or the rotor 12 onto the second coil end part 33B.

Figure 9:
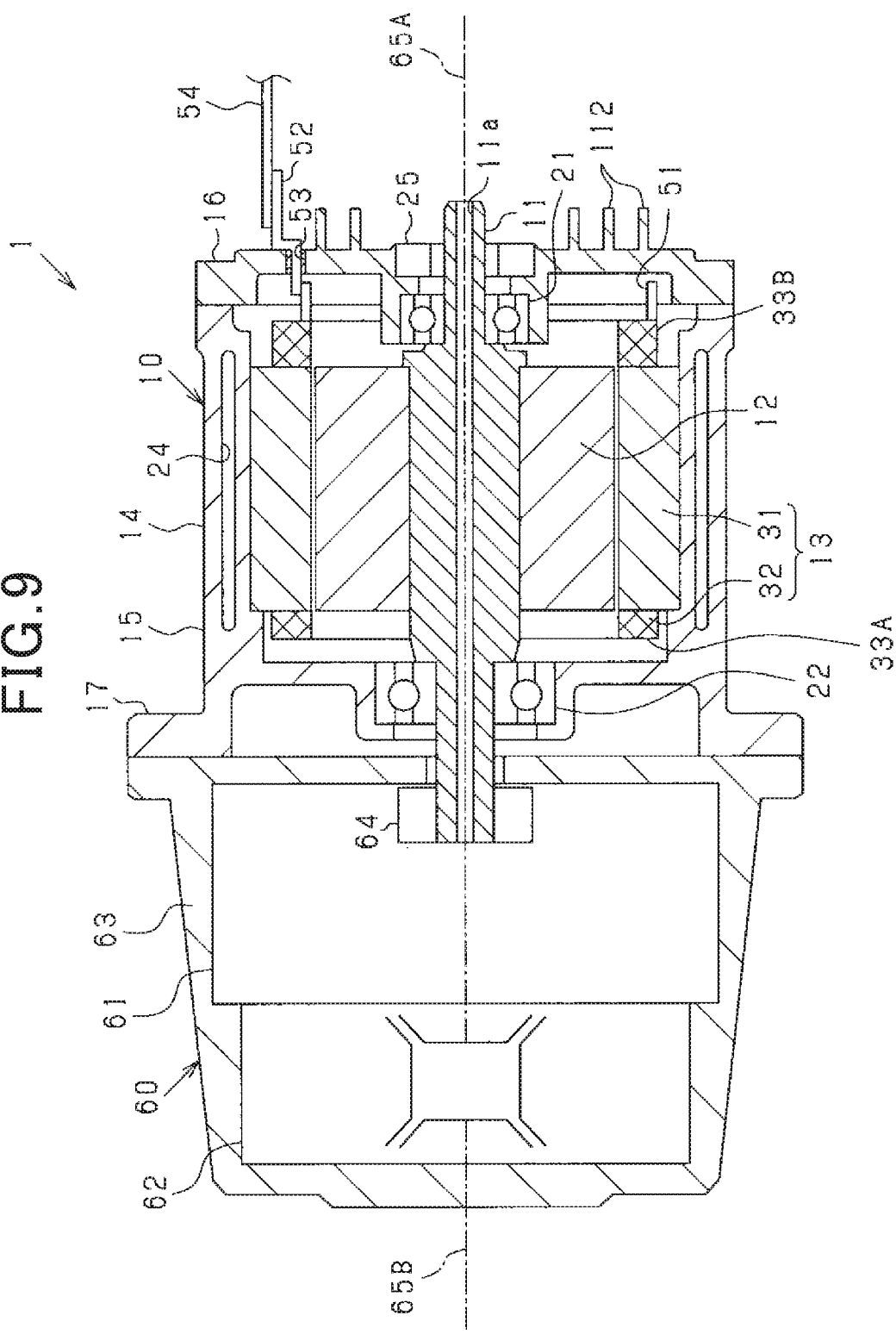
FIG. 9 is a longitudinal cross-sectional view of an electric drive apparatus according to another modification.

(3) As shown in FIG. 9, on the cover 16 of the housing 14 (in other words, on a part of the housing 14 on the same axial side of the stator core 31 as the second coil end part 33B), there may be provided a plurality of protrusions 112 to facilitate dissipation of heat from the housing 14 on the same axial side of the stator core 31 as the second coil end part 33B (i.e., on the opposite axial side of the stator core 31 to the transmission 60).

For example, the protrusions 112 may be formed to have an elongate shape (or fin-like shape). Moreover, the protrusions 112 may be arranged in parallel with each other, in a radial manner or in an annular shape. In this case, with the protrusions 112, it is also possible to increase the mechanical strength of the housing 14.

Alternatively, the protrusions 112 may be formed to have a columnar shape. Moreover, the protrusions 112 may be suitably distributed on the cover 16 of the housing 14.

Figure 10:
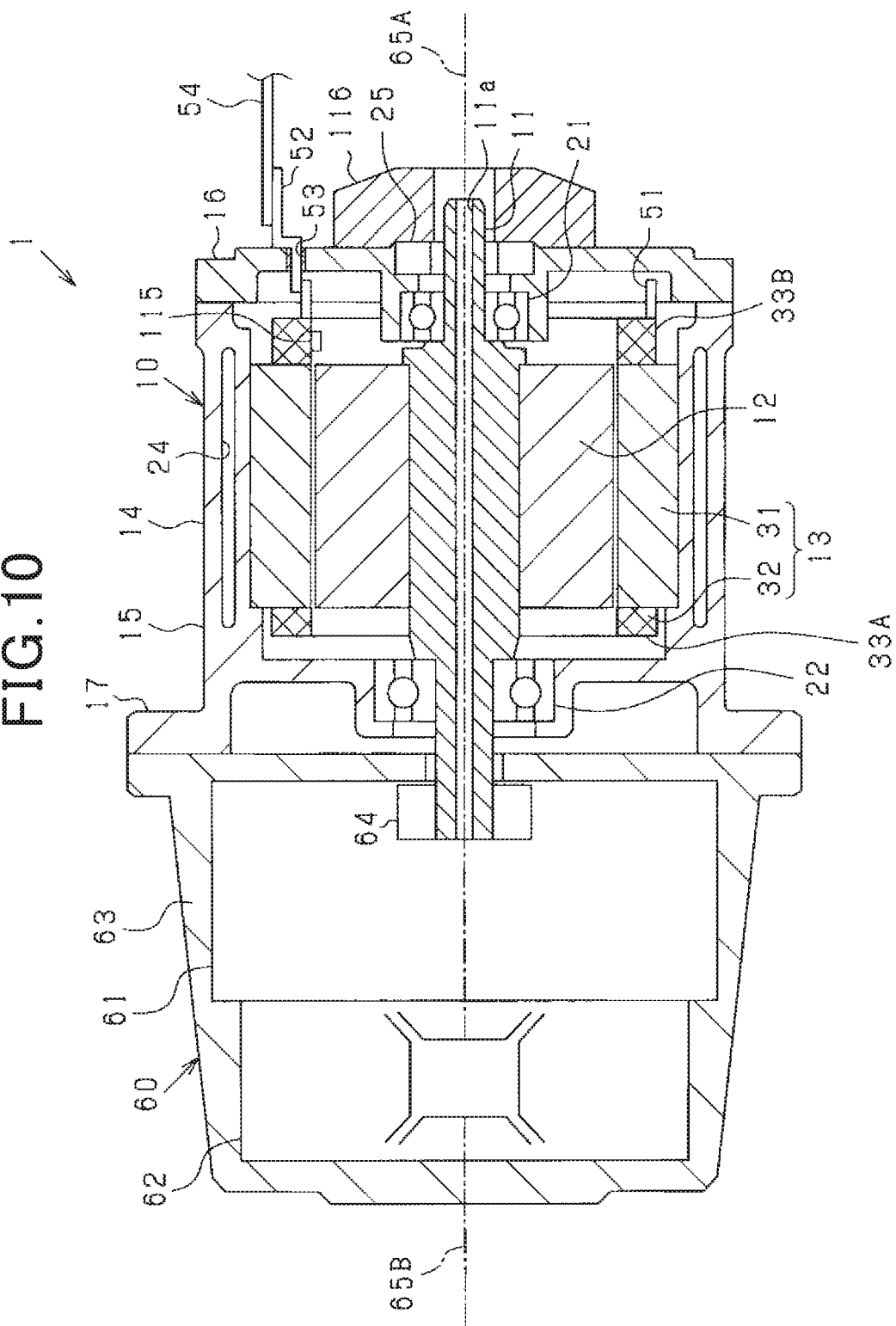
FIG. 10 is a longitudinal cross-sectional view of an electric drive apparatus according to yet another modification.

(4) As shown in FIG. 10, in the housing 14 of the rotating electric machine 10, there may be provided, on the same axial side of the stator core 31 as the second coil end part 33B, a temperature sensor 115 that functions as a temperature detecting unit to detect the temperature of the stator core 32.

Moreover, there may also be provided, on the same axial side of the stator core 31 as the second coil end part 33B, a control device 116 integrally with the rotating electric machine 10. Specifically, the control device 116, which is configured to control operation of the rotating electric machine 10, may be located axially outside the cover 16 of the housing 14 and fixed to the cover 16. In addition, the control device 116 may include an inverter that has a plurality of semiconductor switching elements provided therein.

As described previously, it is easier for heat to be dissipated on the same axial side of the stator core 31 as the second coil end part 33B (i.e., on the opposite axial side of the stator core 31 to the transmission 60) than on the same axial side of the stator core 31 as the first coil end part 33A (i.e., on the same axial side of the stator core 31 as the transmission 60). Therefore, locating the temperature sensor 115 and the control device 116 on the same axial side of the stator core 31 as the second coil end part 33B, it becomes possible to maintain the performances of these devices 115 and 116 and thus improve the reliability of the rotating electric machine 10.

(5) In the above-described embodiment, the housing 63 of the transmission 60 has both the motive power transmitting unit 61 and the differential 62 received therein. As an alternative, the housing 63 may have only the motive power transmitting unit 61 received therein (i.e., no differential 62 received therein).

Moreover, in the above-described embodiment, the motive power transmitting unit 61 is of a gear type. As an alternative, the motive power transmitting unit 61 may be of a friction type (i.e., a type of transmission that transmits motive power by surface friction).

(6) In the above-described embodiment, the housing 14 of the rotating electric machine 10 and the housing 63 of the transmission 60 are first formed separately from each other and then joined together into one piece.

As an alternative, the housings 14 and 63 may be integrally molded as a single component.

(7) In the above-described embodiment, each of the phase windings of the stator coil 32 is formed of a plurality of substantially U-shaped electrical conductor segments 40.

As an alternative, each of the phase windings of the stator coil 32 may be formed of a plurality of sub-windings that are wound on the stator core 31 and connected in series with each other. In this case, each of the sub-windings is formed of a single electric wire having a substantially rectangular cross section. Each of the sub-windings is wound on the stator core 31 at a predetermined pitch to have a plurality of turn portions 42 on both the axial sides of the stator core 31; the turn portions 42 are formed by bending. That is, each of the first and second coil end parts 33A and 33B includes the turn portions 42 of the sub-windings. Moreover, the second coil end part 33B also includes joints at each of which one corresponding pair of end portions of the sub-windings are joined together. In addition, as in the above-described embodiment, the second coil end part 33B is located on the opposite axial side of the stator core 31 to the transmission 60 whereas the first coil end part 33A is located on the same axial side of the stator core 31 as the transmission 60.

(8) In the above-described embodiment, the stator coil 32 is a three-phase coil which has the U-phase, V-phase and W-phase windings star-connected (or Y-connected) with each other.

As an alternative, the U-phase, V-phase and W-phase windings of the stator coil 32 may be Δ-connected with each other.

Moreover, the number of phases of the stator coil 32 may alternatively be two, four or more.

(9) In the above-described embodiment, the rotating electric machine 10 is configured as an inner rotor type rotating electric machine where the rotor 12 is located radially inside the stator 13.

As an alternative, the rotating electric machine 10 may be configured as an outer rotor type rotating electric machine where a rotor is located radially outside a stator.

What is claimed is:

1. An electric drive apparatus comprising:
a rotating electric machine including a rotor, a stator and a housing, the rotor being provided on a rotating shaft so as to rotate together with the rotating shaft, the stator including an annular stator core and a multi-phase stator coil, the housing having both the rotor and the stator received therein; and
a transmission including a motive power transmitting unit that is configured to rotate with rotation of the rotating shaft,
wherein
the transmission is provided, on one side of the rotating electric machine in an axial direction of the rotating shaft, integrally with the rotating electric machine,
the stator coil is assembled to the stator core to have first and second coil end parts respectively protruding from first and second axial end faces of the stator core,
an axial protruding height of the second coil end part from the second axial end face of the stator core is larger than an axial protruding height of the first coil end part from the first axial end face of the stator core,
the first coil end part is located on a same axial side of the stator core as the transmission and the second coil end part is located on an opposite axial side of the stator core to the transmission, and
there is provided, on the same axial side of the stator core as the second coil end part, a neutral joint at which end portions of phase windings of the stator coil are joined together to define a neutral point of the stator coil.

2. The electric drive apparatus as set forth in claim 1, wherein
the stator coil is comprised of a plurality of phase windings, each of the phase windings has a plurality of turn portions formed by bending and a plurality of joints at each of which sections of the phase winding are joined together by welding, and the turn portions are included in the first coil end part of the stator coil and the joints are included in the second coil end part of the stator coil.

3. The electric drive apparatus as set forth in claim 2, wherein for each of the phase windings of the stator coil, the sections of the phase winding are respectively formed of electrical conductor segments, each of the electrical conductor segments is substantially U-shaped to have a pair of straight portions extending parallel to each other and one of the turn portions of the phase winding which extends, on the same axial side of the stator core as the transmission, to connect the pair of straight portions, and each corresponding pair of distal end portions of the electrical conductor segments are joined together at one of the joints on the opposite axial side of the stator core to the transmission.

4. An electric drive apparatus comprising:

a rotating electric machine including a rotor, a stator and a housing, the rotor being provided on a rotating shaft so as to rotate together with the rotating shaft, the stator including an annular stator core and a multi-phase stator coil, the housing having both the rotor and the stator received therein; and a transmission including a motive power transmitting unit that is configured to rotate with rotation of the rotating shaft, wherein the transmission is provided, on one side of the rotating electric machine in an axial direction of the rotating shaft, integrally with the rotating electric machine, the stator coil is assembled to the stator core to have first and second coil end parts respectively protruding from first and second axial end faces of the stator core, an axial protruding height of the second coil end part from the second axial end face of the stator core is larger than an axial protruding height of the first coil end part from the first axial end face of the stator core, the first coil end part is located on a same axial side of the stator core as the transmission and the second coil end part is located on an opposite axial side of the stator core to the transmission, there are provided, on the same axial side of the stator core as the second coil end part, busbars through each of which electric power is inputted to and outputted from one of a plurality of phase windings of the stator coil, the housing of the rotating electric machine has a covering part arranged to cover the second coil end part, and in the covering part of the housing, there is formed a through-hole through which each of the busbars or a terminal member connected with the busbars extends from an inside to an outside of the housing.

5. The electric drive apparatus as set forth in claim 1, wherein in the housing of the rotating electric machine, there is provided a heat transmission member in contact with the second coil end part of the stator coil to have heat dissipated from the second coil end part via the heat transmission member.

6. The electric drive apparatus as set forth in claim 1, wherein the housing has a tubular part to which the stator core is assembled, and in the tubular part of the housing, there is formed an annular coolant passage through which coolant flows.

7. An electric drive apparatus comprising:

a rotating electric machine including a rotor, a stator and a housing, the rotor being provided on a rotating shaft so as to rotate together with the rotating shaft, the stator including an annular stator core and a multi-phase stator coil, the housing having both the rotor and the stator received therein; and a transmission including a motive power transmitting unit that is configured to rotate with rotation of the rotating shaft, wherein the transmission is provided, on one side of the rotating electric machine in an axial direction of the rotating shaft, integrally with the rotating electric machine, the stator coil is assembled to the stator core to have first and second coil end parts respectively protruding from first and second axial end faces of the stator core, an axial protruding height of the second coil end part from the second axial end face of the stator core is larger than an axial protruding height of the first coil end part from the first axial end face of the stator core, the first coil end part is located on a same axial side of the stator core as the transmission and the second coil end part is located on an opposite axial side of the stator core to the transmission, and there is provided, on the same axial side of the stator core as the second coil end part, at least one of a rotational-state detecting unit configured to detect a rotational state of the rotor, a temperature detecting unit configured to detect a temperature of the stator coil and a control device configured to control operation of the rotating electric machine.

8. The electric drive apparatus as set forth in claim 4, wherein the stator coil is comprised of the plurality of phase windings, each of the phase windings has a plurality of turn portions formed by bending and a plurality of joints at each of which sections of the phase winding are joined together by welding, and the turn portions are included in the first coil end part of the stator coil and the joints are included in the second coil end part of the stator coil.

9. The electric drive apparatus as set forth in claim 8, wherein for each of the phase windings of the stator coil, the sections of the phase winding are respectively formed of electrical conductor segments, each of the electrical conductor segments is substantially U-shaped to have a pair of straight portions extending parallel to each other and one of the turn portions of the phase winding which extends, on the same axial side of the stator core as the transmission, to connect the pair of straight portions, and each corresponding pair of distal end portions of the electrical conductor segments are joined together at one of the joints on the opposite axial side of the stator core to the transmission.

10. The electric drive apparatus as set forth in claim 4, wherein in the housing of the rotating electric machine, there is provided a heat transmission member in contact with the second coil end part of the stator coil to have heat dissipated from the second coil end part via the heat transmission member.

11. The electric drive apparatus as set forth in claim 4, wherein the housing has a tubular part to which the stator core is assembled, and in the tubular part of the housing, there is formed an annular coolant passage through which coolant flows.

12. The electric drive apparatus as set forth in claim 7, wherein the stator coil is comprised of a plurality of phase windings, each of the phase windings has a plurality of turn portions formed by bending and a plurality of joints at each of which sections of the phase winding are joined together by welding, and the turn portions are included in the first coil end part of the stator coil and the joints are included in the second coil end part of the stator coil.

13. The electric drive apparatus as set forth in claim 12, wherein for each of the phase windings of the stator coil, the sections of the phase winding are respectively formed of electrical conductor segments, each of the electrical conductor segments is substantially U-shaped to have a pair of straight portions extending parallel to each other and one of the turn portions of the phase winding which extends, on the same axial side of the stator core as the transmission, to connect the pair of straight portions, and each corresponding pair of distal end portions of the electrical conductor segments are joined together at one of the joints on the opposite axial side of the stator core to the transmission.

14. The electric drive apparatus as set forth in claim 7, wherein in the housing of the rotating electric machine, there is provided a heat transmission member in contact with the second coil end part of the stator coil to have heat dissipated from the second coil end part via the heat transmission member.

15. The electric drive apparatus as set forth in claim 7, wherein the housing has a tubular part to which the stator core is assembled, and in the tubular part of the housing, there is formed an annular coolant passage through which coolant flows.

* * * * *